United States Patent [19]
Chappell

[11] 3,877,737
[45] Apr. 15, 1975

[54] FISHING KNOT TYER

[76] Inventor: Glenn D. Chappell, 342 S. State St., Elkhorn, Nebr. 68022

[22] Filed: July 5, 1974

[21] Appl. No.: 485,900

[52] U.S. Cl. ................................................ 289/17
[51] Int. Cl. ............................................ D03j 3/00
[58] Field of Search ...................................... 289/17

[56] References Cited
UNITED STATES PATENTS

| | | | |
|---|---|---|---|
| 2,498,920 | 2/1950 | Holland | 289/17 |
| 3,572,788 | 3/1971 | Cruzan | 289/17 |
| 3,787,081 | 1/1974 | Macy | 289/17 |

Primary Examiner—Louis K. Rimrodt
Attorney, Agent or Firm—Hiram A. Sturges

[57] ABSTRACT
A fishing knot tyer capable of tying a true blood knot comprising a vertically slotted main body, right and left slotted knobs having slotted knob extensions rotatably mounted in said main body, line holders on said knobs whereby portions of two lines can be held in said holders with other portions extending through said slots, whereby with one portion of one line being prevented from being rotated by a line retainer, other portions of said line can be twisted with portions of another line by the completely independent rotation of said knobs in opposite directions.

The knot tyer described further comprising a clinch knot adapter insertable through one of said knobs and having a hook on its inner end for receiving a line portion therethrough and having a spring assembly biasing a shaft for pulling said hook away from an opposite knob which latter can be twisted for twisting the line.

4 Claims, 5 Drawing Figures

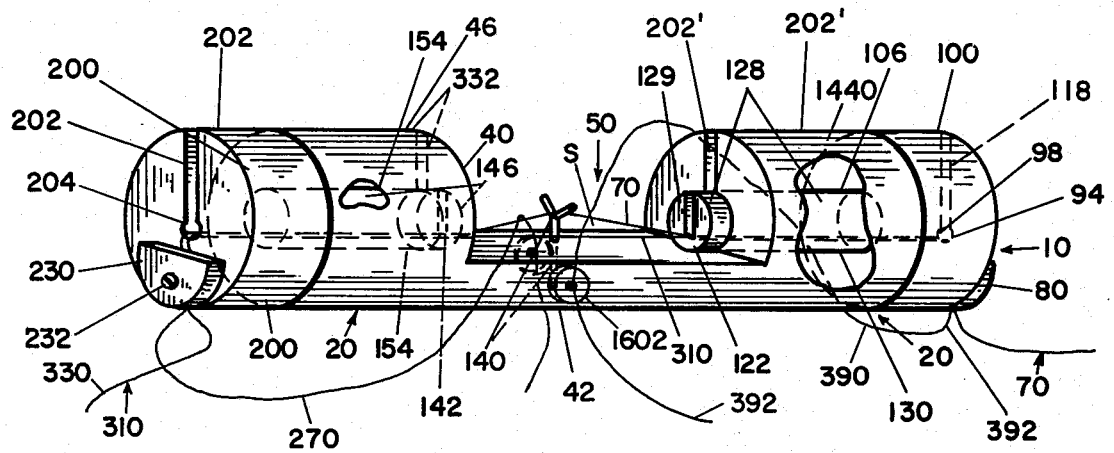
FIG. 1
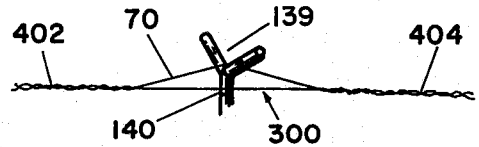
FIG. 2
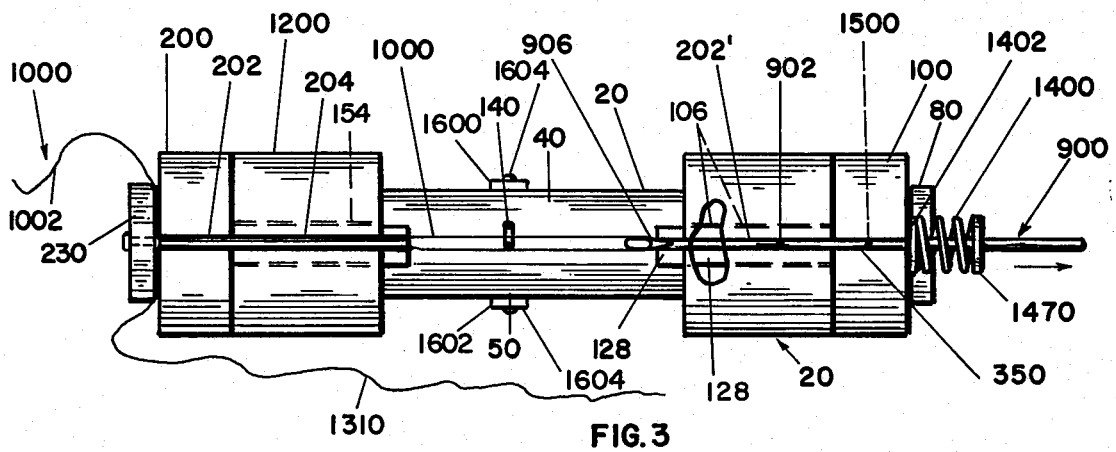
FIG. 3
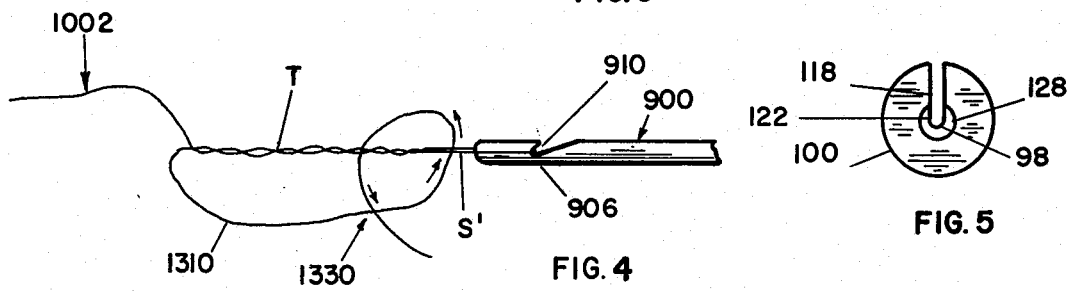
FIG. 4
FIG. 5

FISHING KNOT TYER

FIELD OF THE INVENTION

This invention is in the field of fishing knot typers particularly of a kind that will tie knots known as barrel and blood knots which differ in that a barrel knot has one end of one line wound around its strand in a different direction than is the case with the blood knot.

DESCRIPTION OF THE PRIOR ART

In the prior art, no barrel or blood knot tyers have been conceived, to my knowledge, which have been capable in assisting the tying of a blood knot entirely by rotatable means carried by a main body of the tyer.

It is an object of this invention to provide such a blood knot tyer which is capable also of tying many other knots such as a barrel, snell, hand-loop, drop-loop, and clinch knot.

I am aware that a knot tying device has been proposed in U.S. Pat. No. 3,787,081, issued Jan. 22, 1974, to Carl L. Macy, entitled: BARREL KNOT TYING DEVICE. However, a true blood knot differs from a barrel knot because a blood knot tying requires that the two twisted portions of two lines (being twisted together and separated by a space through which ends of the lines can be passed) must be twisted in opposite directions, which is not possible except with two completely independent rotatable portions, such as the two knobs of my invention which are independently rotatable with respect to the main body.

Sometimes the words "blood knot" and "barrel knot" are used interchangeably as though they meant the same thing, as is understandable because of their similarity.

The blood knot is an excellent and dependable knot, but barrel knots in imitation thereof, which are not tied with such independent rotation as just described, are not, in the opinion of experts whose writings I have studied, as dependable as the true blood knot.

I am aware that barrel knot tyers have been proposed in the prior art in which the twisting is done by another method such as by placing an independent device such as a toothpick between line sections with the purpose of twisting them around each other, such an independent device not being attached to the main body, nor rotatably carried by it, and therefore, being less quick for tying a barrel knot and unable to tie a blood knot.

SUMMARY OF THE INVENTION

A fishing knot tyer capable of tying a true blood knot comprising a vertically slotted main body, right and left slotted knobs having slotted knob extensions rotatably mounted in the main body, line holders on the knobs whereby portions of two lines can be held in the holders with other portions extending through the slots, whereby with one portion of one line being prevented from being rotated by a line retainer, other portions of the line can be twisted with portions of another line by the completely independent rotation of the knobs in opposite directions.

The knot tyer described further comprising a clinch knot adapter insertable through one of the knobs and having a hook on its inner end for receiving a line portion therethrough and having a spring assembly biasing a shaft for pulling said hook away from an opposite knob which latter can be twisted for twisting the line.

BRIEF DESCRIPTION OF THE DRAWING

FIG. 1 is a perspective view of the knot tyer of this invention shown with lines therein in positions for preparing for the twisting of the lines by the rotation of knobs, a portion of the main body portion thereof being broken away for showing the interior, and other portions showing in section.

FIG. 2 is a detail of a yoke of FIG. 1 shown with lines of FIG. 1 which have been twisted.

FIG. 3 is a top plan view of the knot tyer of FIG. 1, but with a clinch knot hook assembly mounted thereon.

FIG. 3 shows a line in position for the tying of a clinch knot. A portion of the body of FIG. 3 is broken away and other portions are shown in section.

FIG. 4 is a detail showing the hook end of the clinch knot hook assembly of FIG. 3 with a line thereon shown in the position it is in after the line has been twisted and an end thereof has been put in position preparatory to the drawing up of the clinch knot into compact form.

FIG. 5 is a view of the right end knob with its attached knob extension as it would be seen from the inner end of the knob extension looking parallel to the knob extension.

DESCRIPTION OF THE PREFERRED EMBODIMENT

The blood knot tyer 10 of this invention will tie many other knots as mentioned above and is provided with a main body 20 which can be made of plastic, wood, or other material.

The body 20 has a body notch 40 in a top side thereof for providing an open area 50 separating right and left spaced apart body end portions 44 and 46 which latter are connected by a connecting body portion 42.

The right and left body end portions 44 and 46 have right and left knob extensions receiving passages 106 and 154 respectively extending completely therethrough respectively from right to left and disposed approximately in alignment with one another and disposed extending from the outer side of said right and left body portions respectively inwardly to the body notch 40.

The main body portion 20 has right and left body slots 202' and 332 respectively which extend into the right and left end portions 44 and 46 respectively from upper sides thereof respectively. Each right and left body slot 202' and 332 extends completely from right to left through the respective body end portion 44 or 46.

The right and left body slots 202' and 332 are each alignable with and placeable in communication with the right and left knob extension passages 106 and 154 respectively all along the length of the knob extension passages 106 and 154.

Right and left knobs 100, 200 are disposed at the right and left ends of the main body portion 20. Right and left extensions 128 and 146 are attached respectively to the right and left knobs 100, 200, the extensions 128 and 146 extending rotatably through the right and left knob extension passages 106 and 154 since the passages 106 and 154 are each cylindrical in shape.

The inner ends of the extensions 128 and 146 project inwardly beyond the inner ends of the main body end portions 44, 46 respectively. The knob extensions 128 and 146 have knob extension slots 122 and 142 extending into each extension 128 and 146 respectively and extending completely from right and left through each extension from its knob end to its inner terminal and inner terminal ends of the knob extensions 128, 146 are spaced apart with portions of the notch 40 therebetween.

The right and left knobs 100, 200 have a right knob slot 118 and a left knob slot 202 extending therethrough respectively from right to left and entering from the top thereof and disposed in alignment with the respective extension slots 122, 142.

The knob slots 118 and 202 are preferably in alignment with each other, also, whereby a fishing line can be passed downwardly through either of the knob slots 118 and 202 and also downwardly through respective body slots 202', 332 and a respective knob extension slot 128, 146 so that a line can extend directly through either of the knobs 100, 200 and through the extension slot of each and out through the inner terminal end of the respective extension.

A yoke or retainer 140 is attached to the main body portion 20 in the notch 40 in a position such that a line passing between the respective extension slots 122, 142 can be engaged with the retainer 140 by extending through its notch 129 and the line in the retainer will be prevented by the retainer from moving out of engagement with the retainer 140 during rotation of the knobs 100, 200 when ends of the line are fixed in the body end portions respectively. For example, the ends of the line 70 are fixed in the body end portions respectively, which latter can be accomplished by passing the ends under right and left line holders 80, 230 mounted on and rotating with knobs 110, 200 and adapted to receive ends of any lines which are wedged between the holders 80, 230 and respective knobs 100, 200, holders 80, 230 being held in place by screws 232, only one of which can be seen in FIG. 1.

The holders 80, 230 and the screws 232, therefore, are identical.

The yoke 140 is imbedded in the main body portion and extends upwardly therefrom.

In use, one line 70 of two lines 70 and 310 to be blood-knot-tied end-to-end is caused to be first passed under the right holder 80 where it is wedged between the right holder 80 and the right knob 100 and the right holder 80 the line 70 passes through the right knob slot 118 and through the right extension slot 122 into which the line 70 can be laterally placed because the right extension slot 122 is in alignment with the right knob slot 118. Then, the line 70 extends through the right knob extension passage 130, extending to the notch 40 through the right-hand end of the body 20.

The line 70 then extends out of the slot 122 at the inner end 129 of the right knob extension 128 and up through the notch 139 in the retainer 140, and thence downwardly into the left knob extension slot 142.

The line 70 then extends out throught the left-hand end of the left knob slot 202 and thence downwardly under a left-hand holder 230 fixed to the left-hand knob 200 by a screw 232, whereby the line 70 is jammed under and held between the holder 230 and the body 20 so that the short terminal end section 270 of the line 70 is free to be next inserted into a space S disposed between the line 70 and another line 310.

The line 310 has a long end generally indicated at 330 and which extends under the left holder 230 and is placed through the knob slot 202 at its enlarged innermost portion 240 and from thence through the left knob 200 and then is passed down through a left body-slot 332 of the body 20.

The left body-slot 332 extends down to the left-hand knob extension 146 and so the line 310 is caused to enter and lie in the left-hand knob extension slot 142 and extend to the inner end of the left-hand knob extension 146. The line 310 extends across along one side of the yoke 140 to the slot 129 of the right-hand knob extension 128 and extends through the slot 129 until it enters a slot 350 in the right-hand knob 100 and extends out from there to be clamped under the right-hand holder 80 with sufficient extra length for extending out from the right-hand holder 80 to provide a smaller end 392 of the line 390 which is then lead around the backside of the body 20 and inserted through the space S from the other side.

Thereafter, the knobs at the right and left-hand ends can be twisted in opposite directions until the two lines 70 and 310 are intertwined, as seen at 402 and 404 in FIG. 2. The twisting to accomplish twisting at 402 and 404 can be done after the lines have their ends put through the space S as described and continued until an adequate twisting has been done, perhaps four turns per knob.

Thereafter, it will be possible to release the long ends of the lines 70 and 310 from the holders 80 and 230 so that the pulling of the lines 70 away from each other and in opposite directions will tend to draw the slack out of the portions thereof that are disposed in the opening 40 of the body 20 until the lines will be found to be interconnected with a barrel knot which is very stong, even with slippery lines, such as two lines of thin, flexible, nylon fishing leader.

The last thing to be done is to snip off excess portions of the line 70 that stick out from a resultant knot and then the knot will be formed and finished and neat.

In FIGS. 3 and 4, a way of tying a different kind of knot called the "clinch knot" is shown. For this purpose, a special hook assembly generally indicated at 900 and having a shaft 902 is inserted so that a portion of the shaft extends through the left knot 100 in its slot 350, and then through the slot 202' of the right end portion of the body 20 so that a tip end or hook section 906 extends into the opening 40 where it receives, through a notch 910 of its hook, a line generally indicated at 1000 having a long end 1002 which extends under the right holder 230 in which it is jammed and from there up and around the hook 906 and then back through the passages 204 in the enlarged portion 1200 of the left side of the barrel and through a passage 202, earlier described, of the left knob 200, and from thence out to a jamming under the holder 230, whereby a free end or small end section 1310 of the line 1000 is free.

Referring to FIG. 4, a condition is there shown in which a difference from FIG. 3 exists in that at the time of FIG. 4, the left knob 200 of FIG. 4 has been twisted sufficiently that there is a very considerable twisting of the two parts of the line 1000 that pass to and from the hook 906. After this twisting has been done, but not too tightly so that a space exists at S' between the two line portions adjacent the hook 906, then the free end 1310 is first freed from the clamp 230 and then is passed through the space S' and then downwardly again between the twisted portion T of the line and a part of the line section 1310, as indicated at area 1330.

At the last, to tighten the knot, the long end line portion 1002 is pulled, this will tighten the knot since the short end 1310 has been freed from the clamp 230 just before passing the short end 1310 through the space S' as earlier described.

On the hook assembly 900 during this operation, the hook 906 is continually urged to the right by the effect of a compression spring 1400 which urges a moving washer 1402 against the right knob 100 since the other end of the spring 1400 engages a flange 1476 fixed to the shaft 902. A protrusion in the shaft 902 can be seen at 1500 and it has the effect of preventing the washer 1402 from falling off of the hook end of the shaft 902.

A different and second way of using the tyer 10 for blood knots, as in FIG. 1, is to cause the line ends 270 and 390, after each has been inserted through the space S, as described, to be next secured under edges of forward and rearward line grip assemblies 1600 and 1602, attached to the body 20 by screws 1604, and respectively constructed like the line holders 80 and 230.

After line ends are put under the grip assemblies 1600 and 1602, then the lines 70 and 310 can be released from the line holders 80, 230 and the knot is then compacted.

For a true blood knot, it is important that the ends of the two lines be placed through the space S from opposite sides in accordance with the way they are wound by the twisting of the knobs in opposite directions.

As best seen in FIG. 5, the slot 122 of the right knob extension and the slot 118 of the right knob 100 are disposed in alignment, whereby both can be faced upwardly in alignment with the right body slot 202' for the insertion of lines as earlier described.

It will simplify understanding to observe that the right knob extension 128 and right holder 80 are all constructed and shaped identically to the left knob 200, left knob extension 146 and left holder 230.

I claim:

1. A fishing knot tyer 10 capable of tying a true blood knot comprising a main body 20 having right and left spaced body end portions 44, 46 and having a connecting body portion 42 connecting the end portions, said main body having a body notch 40 therein on its upper side above said connecting portion and separating said end portions, said body end portions having right and left knob extension receiving passages 106, 154 extending therethrough respectively from right to left and in communication with said notch, said main body portion (20) having right and left body slots (202', 332) each extending into a respective one of said right and left end portions (44, 46) from an upper side of the respective one of said right and left end portions and extending from right to left through said body end portions (44, 46), and alignable with and placeable in communication with said right and left knob extension passages (016,154) respectively all along the length of said passages (106, 154), right and left knobs (100, 200) disposed at the right and left ends of said main body portion (20), right and left knob extensions (128, 146) attached respectively and having inner ends projecting inwardly beyond inner ends of said main body end portions (44, 46) respectively, said knob extensions (128, 146) having inner terminal ends spaced apart by a portion of said body notch (40), said knob extensions (128, 146) having extension slots (122, 142) extending into each extension (128, 146) respectively and extending along each extension respectively from its knob end to its inner terminal end, said knobs each having a knob-slot (118, 202) extending therethrough from right to left and entering from the top thereof, said extension slots and said knob slots of each knob and its attached extension respectively being in alignment with each other and also being alignable with a respective one of said body slots (202', 332) whereby a fishing line can be passed downwardly through either of said knob slots and also downwardly through a respective adjacent body slot and knob-extension slot so that a line can extend directly through either of said knobs and through its extension slot and out the terminal end of its extension, and a retainer (140) attached to said main body portion and disposed in a position such that a line passing from the extension slot of one of said extensions to the extension slot of the other of said extensions can be engaged with said retainer and will be prevented by said retainer from moving out of engagement with said retainer during rotation of said knobs when ends of said line are fixed in said body end portions respectively, right and left line holding means (80, 230) mounted on and rotating with said knobs and adapted to receive and hold ends of lines which extend beyond outer ends of said knob slots.

2. The combination of claim 1 in which said line retainer comprises a yoke extending upwardly from said main body portion and having a notch in its outer end through which a line can be caused to extend for retaining the line in a manner described.

3. The fishing knot tyer of claim 1 further provided with a clinch knot adapter hook assembly comprising an elongated shaft having a hook at its inner end, said shaft having an outer portion extending beyond that outer end of one of said knobs which faces away from said main body portion, said shaft having a hook portion projecting from the inner end of a respective knob extension which latter is attached to said one knob, said shaft having an intermediate section extending through said one knob through the knob extension to which said one knob is attached, said shaft having an inner end extending beyond said one knob extension and having a notch therein suitable for receiving a fish line, a spring assembly mounted on said shaft and bearing against the outer end of said one knob and biasing said shaft so as to draw said hook toward said one knob.

4. The fishing knot tyer of claim 1 in which grip assembly means is mounted on said body for releasably securing the ends of fishing lines prior to the tightening of a blood knot.

* * * * *